(12) United States Patent
Barrepski

(10) Patent No.: US 7,621,486 B1
(45) Date of Patent: Nov. 24, 2009

(54) RETAINING DEVICE

(76) Inventor: Christopher R. Barrepski, 9 Edgewood Rd., Ellington, CT (US) 06029

( * ) Notice: Subject to any disclaimer, the term of this patent is extended or adjusted under 35 U.S.C. 154(b) by 110 days.

(21) Appl. No.: 10/993,574

(22) Filed: Nov. 19, 2004

Related U.S. Application Data

(60) Provisional application No. 60/520,897, filed on Nov. 19, 2003.

(51) Int. Cl.
*F16L 3/08* (2006.01)
(52) U.S. Cl. .................. 248/65; 248/231.81; 248/228.7
(58) Field of Classification Search .................. 248/58, 248/65, 67.7, 67.5, 316.7, 230.7, 231.81, 248/228.7; 24/16 R, 17 AP; 285/61, 64; 52/357, 360
See application file for complete search history.

(56) References Cited

U.S. PATENT DOCUMENTS

| | | | |
|---|---|---|---|
| 631,887 A | | 8/1899 | Clark |
| 702,704 A | * | 6/1902 | Carll ........................... 248/59 |
| 884,256 A | | 4/1908 | Addie |
| 893,378 A | | 7/1908 | Rosenfeld |
| 971,438 A | | 9/1910 | Gillitt |
| 989,808 A | | 4/1911 | Rockwood et al. |
| 2,111,357 A | | 3/1938 | Cornell |
| 2,385,209 A | | 9/1945 | Joyce |
| 2,587,150 A | | 2/1952 | Hansen et al. |
| 3,228,640 A | * | 1/1966 | Wolsh .......................... 248/72 |
| 3,983,602 A | | 10/1976 | Barry |
| 4,251,844 A | * | 2/1981 | Horstmann .................... 361/1 |
| 5,150,865 A | | 9/1992 | Miller |
| 5,788,440 A | * | 8/1998 | Andronica ................... 411/178 |
| 6,012,691 A | * | 1/2000 | van Leeuwen et al. ... 248/228.3 |
| 6,206,613 B1 | * | 3/2001 | Elkins ......................... 405/157 |
| 6,257,530 B1 | * | 7/2001 | Tsai ........................... 248/74.2 |
| 6,443,402 B1 | * | 9/2002 | Ferrill et al. .................. 248/65 |
| 6,752,426 B2 | * | 6/2004 | Kacines et al. .............. 280/782 |

FOREIGN PATENT DOCUMENTS

WO    WO 92/09217    6/1992

* cited by examiner

*Primary Examiner*—A. Joseph Wujciak, III
(74) *Attorney, Agent, or Firm*—Deborah A. Basile; Karen K. Chadwell

(57) ABSTRACT

Disclosed herein is a retaining device comprising a securing element comprising a handle, wherein the handle comprises a top opposite to a bottom; and a base comprising a horizontal member; a first arm connected to the horizontal member and comprising a side bearing teeth; and a second arm connected to the horizontal member and comprising a side bearing teeth; wherein the first arm and the second arm are connected to the horizontal member to form a space between the first and second arms, and wherein the sides bearing teeth face each other; wherein the securing element is connected to the base, and wherein the base attaches the retaining device to an anchoring surface, and wherein the securing element holds a piping(s) or a piece of equipment.

2 Claims, 16 Drawing Sheets

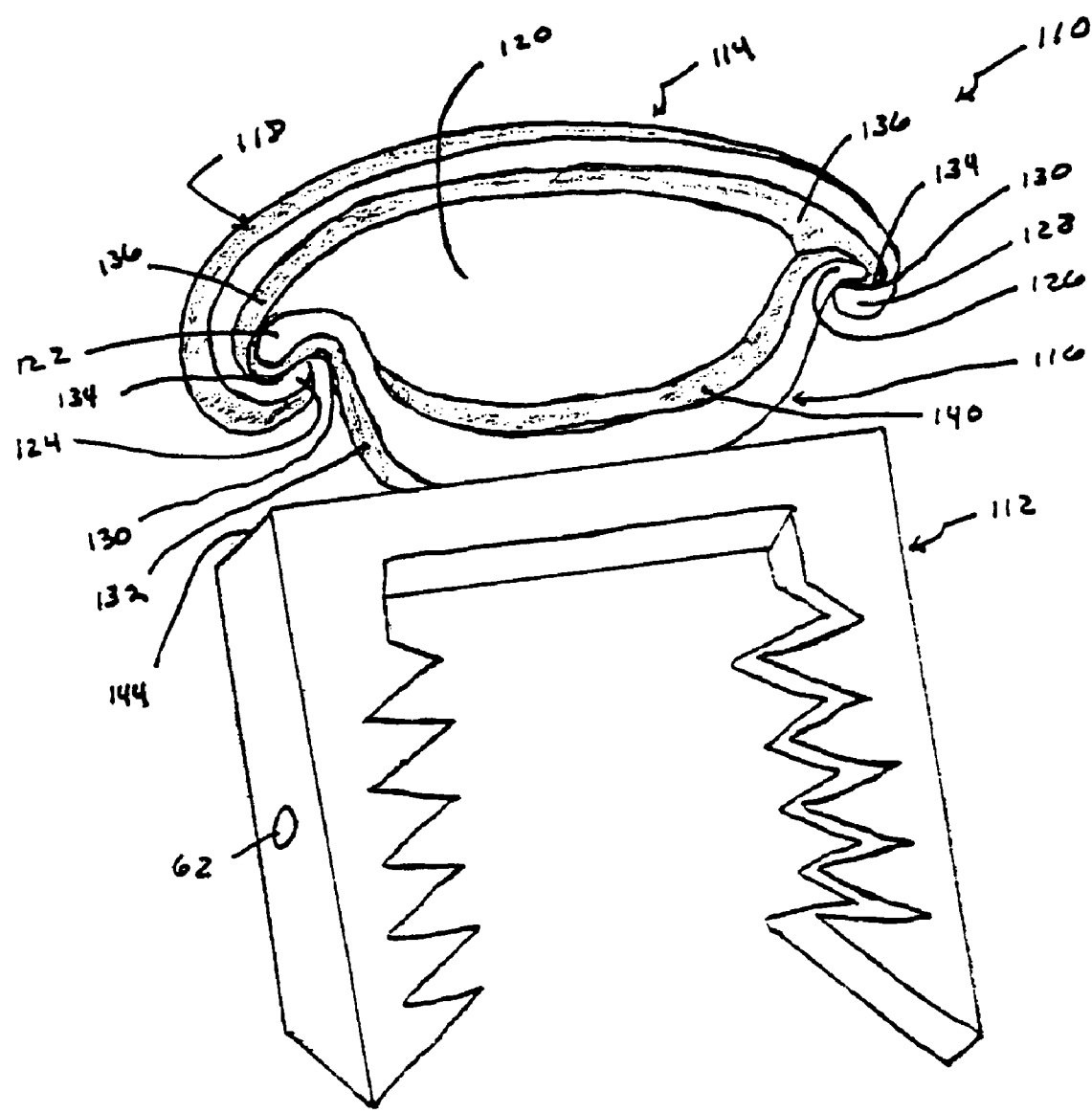

RETAINING DEVICE

CLAIM FOR PRIORITY

Pursuant to 35 U.S.C. § 119(e), this Non-Provisional Application claims priority to Provisional Application Ser. No. 60/520,897 filed on Nov. 19, 2003.

BACKGROUND OF THE INVENTION

Installing equipment containing a large number of wires and/or pipes is currently time consuming and laborious requiring much time spent in containing and directing such wires and/or pipes. Little has been done to ease the burden of such installation. Currently, containing and directing wires and/or pipes involves the use of a number of materials, such as separate components and hardware, which increases the time and the cost of installation. Therefore, what is currently needed is a device to ease and to quicken the installation process of equipment containing a large number of wires and/or pipes, such as is found in air conditioning systems, and to reduce or eliminate the number of materials currently necessary for installation.

SUMMARY OF THE INVENTION

The above-discussed and other drawbacks and deficiencies of the prior art are overcome or alleviated by a retaining device comprising a securing element comprising a vertical part, wherein the vertical part comprises a top opposite to a bottom; and a base comprising a horizontal member; a first arm connected to the horizontal member and comprising a side bearing teeth; and a second arm connected to the horizontal member and comprising a side bearing teeth; wherein the first arm and the second arm are connected to the horizontal member to form a space between the first and second arms, and wherein the sides bearing teeth face each other; wherein the securing element is connected to the base, and wherein the base attaches the retaining device to an anchoring surface, and wherein the securing element holds a piping(s) or a piece of equipment.

BRIEF DESCRIPTION OF THE DRAWINGS

FIG. 17 is a schematic of another exemplary retaining device.

DETAILED DESCRIPTION OF THE INVENTION

In general, disclosed herein is a retaining device and its method of use. More particularly, disclosed herein is a retaining device to hold and/or direct piping, wherein the retaining device is secured to an anchoring surface. As used herein, "piping" refers to tubes, wires, pipes, leads, and the like typically used in connection with the installation of equipment such as central air conditioning systems. The retaining device is particularly well adapted to fit onto anchoring surfaces, such as, studs typically found in walls, floors, ceilings, and attics. In addition to the piping, the retaining device may be used to secure a wide variety of hanging objects, such as hanging equipment. The retaining device disclosed herein comprises a securing element permanently or detachably and directly or indirectly connected to a base.

The securing element may comprise any material having sufficient durability to withstand the operating environment and sufficient strength to withstand the weight of the piping and/or the hanging objects. Additionally, the securing element preferably comprises a material having sufficient pliability such that, when used, the piping can be positioned into the securing element with minimal effort. Preferably, the securing element comprises plastics, metals, and the like, and combinations comprising at least one of the foregoing. Especially preferred plastics include those plastics formed in an injection molding process including engineered grade plastic composites of thermoplastics, thermosets, and thermoplastic elastomers, as well as, commodity grade plastics. Where a metal is used to form the securing element, the metal is preferably suited for the particular application of the securing element. Especially preferred metals include aluminum and various steel grades.

The base may comprise any material having appropriate durability, strength, and pliancy such that the base can achieve operating expectations. Preferably, the base comprises plastics, metals, and the like, and combinations comprising at least one of the foregoing, wherein the plastics and metals are preferably identical or similar to those mentioned above in reference to the securing element. The base may comprise the same or different material(s) as the securing element.

The retaining device may comprise a wide variety of geometrical shapes and designs, wherein the design is determined by the purpose and design of the piping and/or the hanging object to be secured on to the retaining device. Furthermore, the base and the securing element may either be detachable from each other, or they may be non-detachable, such as where the securing element and the base are molded as a single piece.

Figure 1:
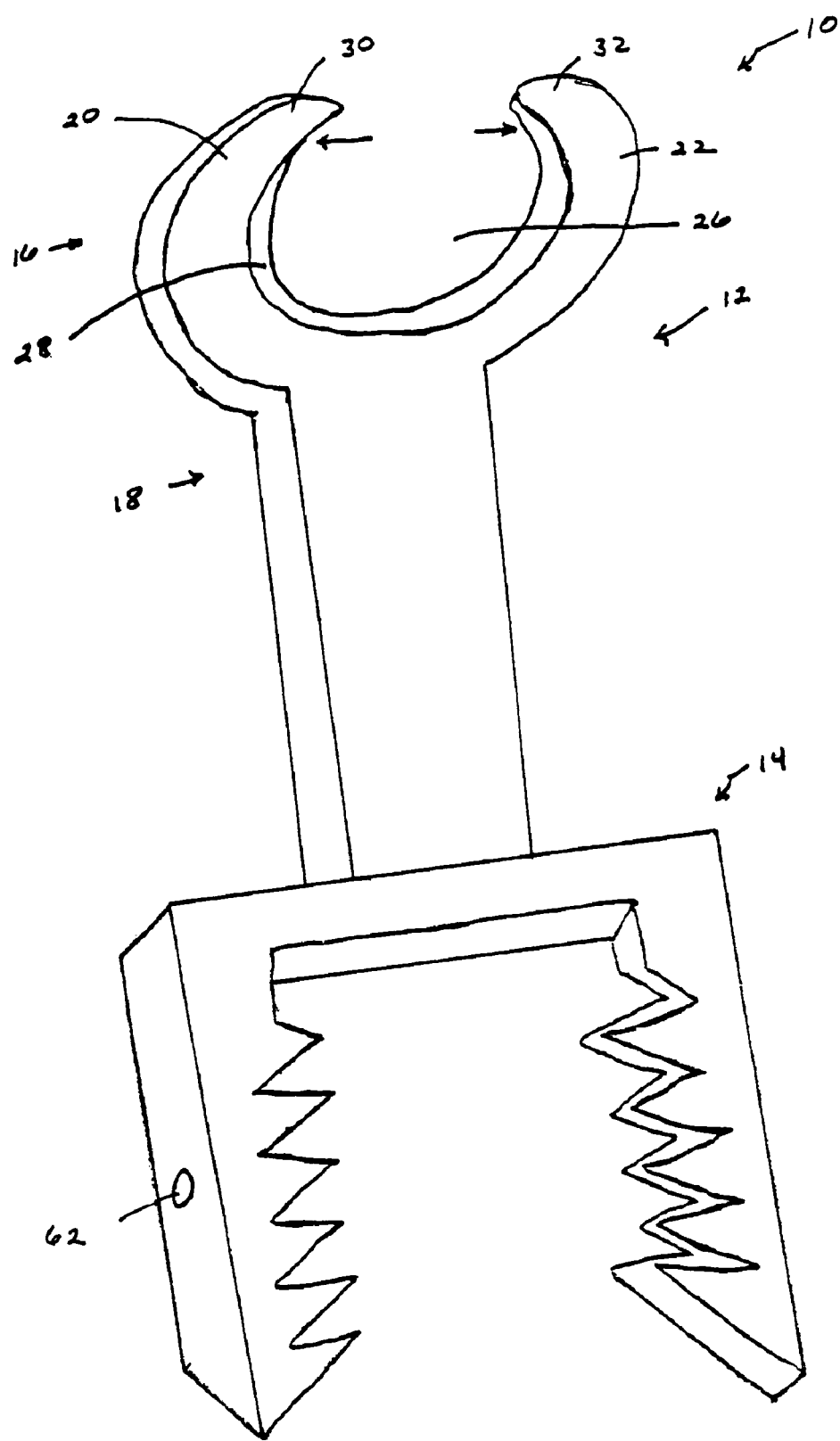
FIG. 1 is a schematic of an exemplary retaining device.

Exemplary retaining devices are described in greater detail with reference to the Figures. Referring to FIG. 1, an exemplary retaining device 10 comprises a securing element 12 connected to a base 14.

Securing element 12 comprises a receiver 16 continuously connected to a vertical part 18. Receiver 16 and vertical part 18 may be fused together in a permanent fashion as shown in FIG. 1, or these components may be detachable from each other. Where detachable, receiver 16 may be secured to vertical part 18 by screws, bolts, snap-fit means, etc.

Receiver 16 comprises a partially open configuration preferably shaped to hold the piping. That is, where the piping is tubular in shape, then receiver 16 comprises a partially open configuration as shown in FIG. 1. Where, for example, the piping is polygonal in shape, the piping may comprise a polygonal partially open configuration or any other geometrical configuration which will allow for the secure placement of the piping into the receiver.

When in an embodiment such as that shown in FIG. 1, receiver 16 preferably comprises a shoulder 20 connected to a shoulder 22, wherein each of shoulders 20, 22 terminate in a lip 30, 32 respectively. A gap is created between lips 30, 32 to lead into a hollowed portion 26 formed between shoulders 20 and 22. Both of shoulders 20 and 22 comprise an interior wall 28, which is directed towards hollowed portion 26.

Piping may be placed through receiver 16 and secured to interior wall 28 by applying an outward force (as shown by the arrows in FIG. 1) against lips 30, 32, such that shoulders 20, 22 expand outwardly. Such outward expansion allows the piping to fit through the gap between lips 30, 32. Alternatively, where the diameter of the piping is smaller than that of the gap formed between lips 30, 32, the piping may simply be positioned onto interior wall 28 through hollowed portion 26 without exerting any force on lips 30, 32 though still allowing for a secure fit between securing element 12 and the piping.

The diameter of hollowed portion 26 may vary widely depending on the diameter of the piping, wherein it is contemplated that an individual receiving element may be sufficiently pliable to hold differently sized diameter pipings. Nevertheless, by way of example, for pipings up to about 6 inches in diameter, hollowed portion 26 may comprise a diameter of at least about 0.50 inches, wherein at least about 0.75 inches is more preferred, and at least about 1 inch is especially preferred.

Vertical part 18 may comprise a wide variety of lengths, wherein length is determined based on the desired distance between the anchoring surface and the piping. Preferred lengths comprise from about 1 inch to about 36 inches, wherein a length of about 3 inches to about 24 inches is more preferred, and a length of about 6 inches to about 12 inches is especially preferred. Vertical part 18 may comprise a single length, wherein the length may be fixed and determined based on the specific application, or the length may be adjustable such that various lengths may be achieved by a single vertical part 18. Such adjustment may work, for example, by a telescopic mechanism or by a screw mechanism.

Vertical part 18 may be permanently or detachably connected to base 14. Where permanently attached, vertical part 18 may be melded or fused into base 14 by any one of known means. Where detachably connected, vertical part 18 and base 14 may be constructed to allow for attachment by means of a screwing action, or by means of a snap-fit mechanism, for example.

Figure 2:
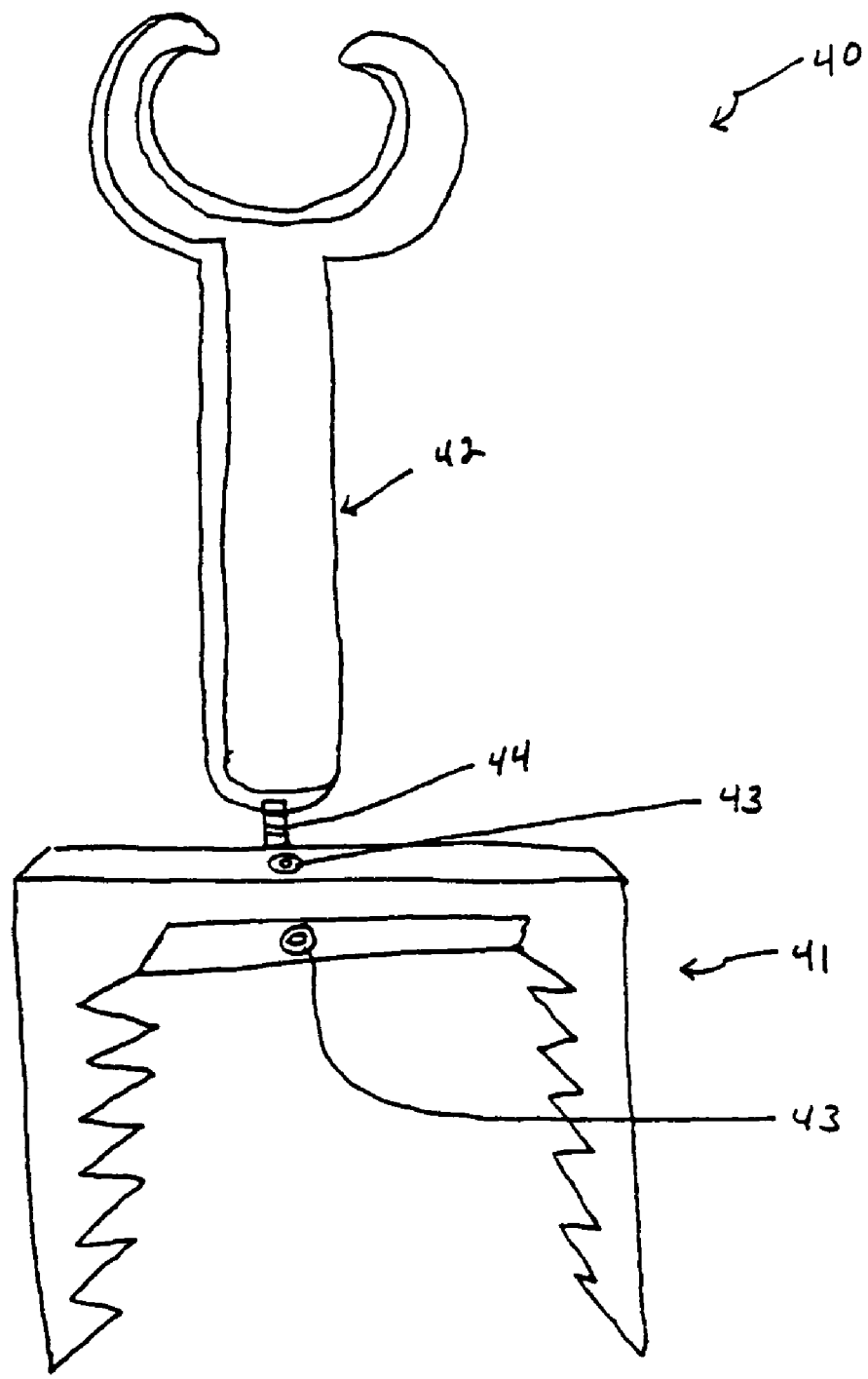
FIG. 2 is a schematic of an exemplary attachment means.

An exemplary retaining device to be detachably connected to the base is depicted in FIG. 2, wherein a vertical part 42 of a securing element 40 is to be connected to a base 41 via a screwing action. In this exemplary embodiment, vertical part 42 comprises a bolt or a screw 44 extending from a bottom side of vertical part 42, wherein bolt or screw 44 may be inserted into a respective complementary bolt hole or screw hole 43 formed in base 41 (more particularly, bolt hole or screw hole 43 is preferably located on a horizontal member of base 41 as will be described in detail below).

Figure 3:
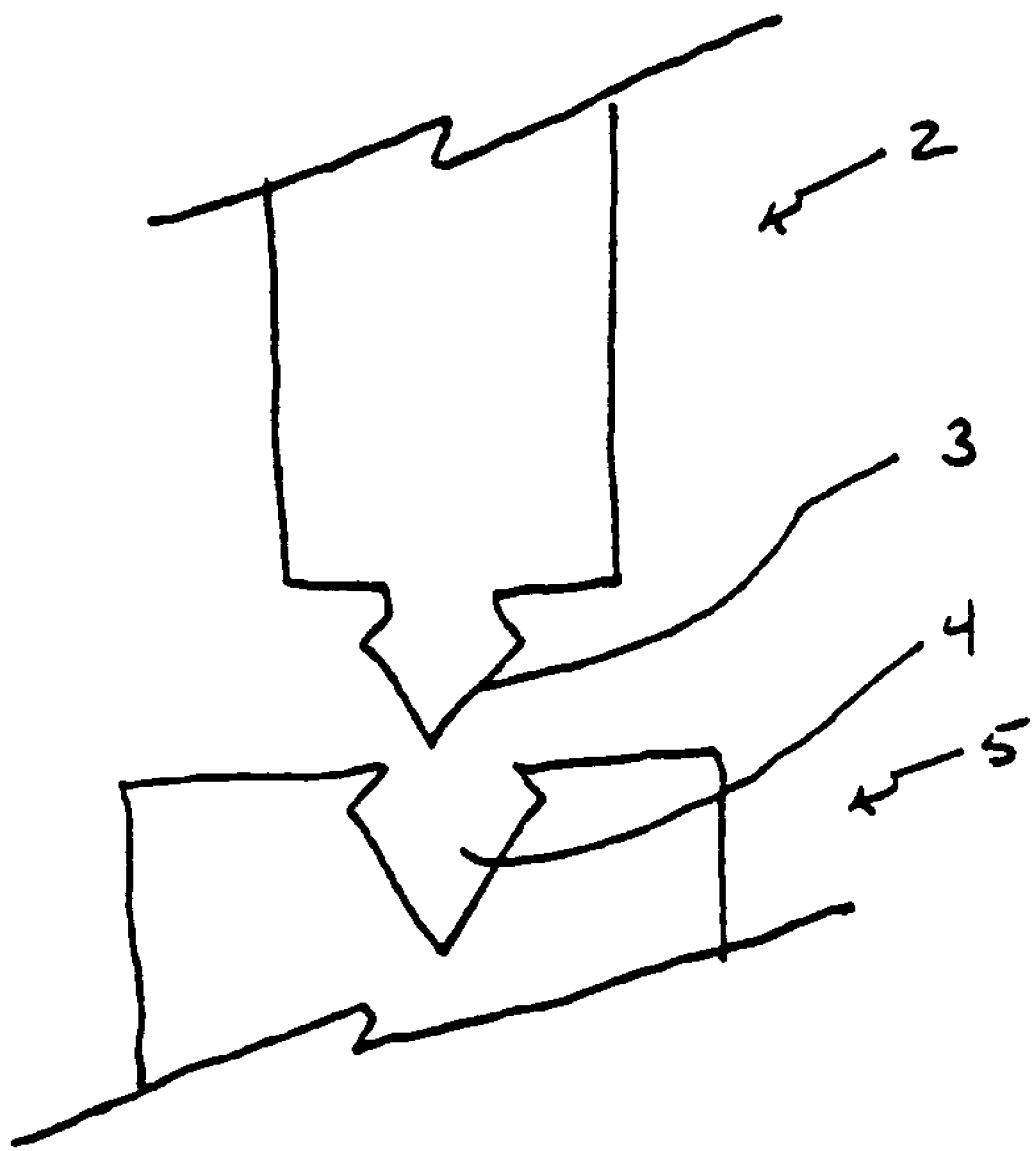
FIG. 3 is a schematic of another exemplary attachment means.

An exemplary retaining device comprising a securing element directly attached to a base by means of a snap-fit mechanism is shown in FIG. 3. Here, a securing element 2 comprises an extension 3, which extends from a bottom side of the vertical part 42, wherein extension 3 is adapted to fit into a groove 4 on a base 5 (more particularly, groove 4 is preferably located on a horizontal member of base 5 as will be described in detail below). Securing element 2 is secured onto base 5 by applying pressure to securing element 2 such that sides of base 5 forming the boundaries of groove 4 expand in opposite directions upon exertion of the force, and then contract to hold extension 3 once the force is removed. The geometrical configurations of extension 3 and groove 4 may vary widely, and are only limited in that groove 4 should adequately secure extension 3 such that little to no movement of securing element 2 occurs.

Figure 4:
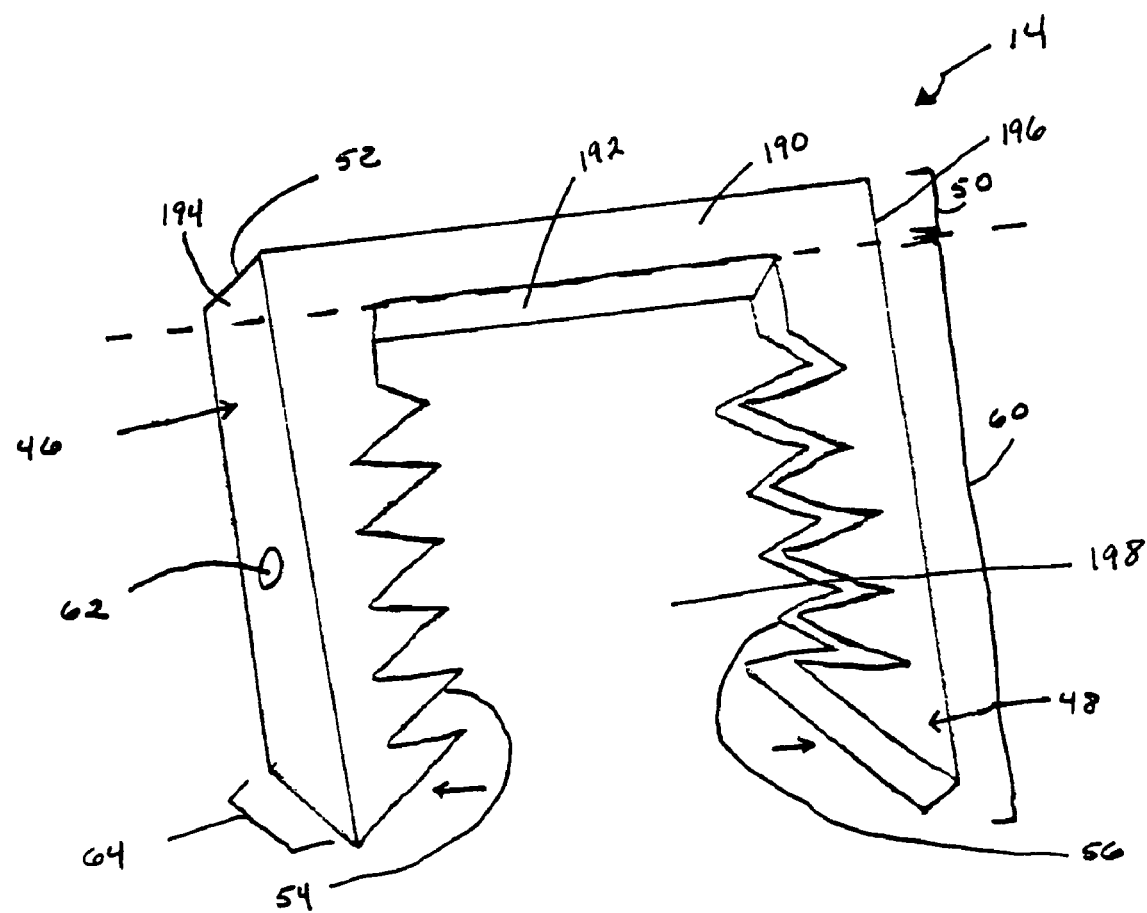
FIG. 4 is a schematic of an exemplary base.

Exemplary base 14, as shown in FIG. 1, is shown in greater detail in FIG. 4. Referring to FIG. 4, base 14 is divided into a top portion 50 and a bottom portion 60. Top portion 50 is defined by a horizontal member 190 comprising a top side 52, a bottom side 192, a proximal side 194, and a distal side 196. Bottom portion 60 is defined by arms 46 and 48, which are connected to horizontal member 190 such that arms 46, 48 extend downwardly from bottom side 192. Arms 46, 48 are separated from each other to form a space 198.

Each of arms 46, 48 comprises a series of teeth 54, 56 respectively, wherein teeth 54, 56 attach and firmly hold the retaining device to an anchoring layer. The anchoring layer may comprise a typical standard framing stud, wherein the framing stud may comprise, for example, conventional 2×4, 2×6, or 2×8 studs, and the like. Series of teeth 54, 56 may each comprise about 6 to about 36 individual teeth, wherein about 12 to about 24 individual teeth is preferred.

At least one of arms 46, 48 further comprises an optional attachment site (shown on arm 46 as a hole by reference numeral 62) by which base 14 may be more firmly secured onto an anchoring layer. Attachment site 62 is adapted to fit fastening means, such as, nails, screws, and the like. It is further contemplated that a series of attachment sites may be disposed along a length of either one of the arms such that the base can be further secured to an anchoring surface at any one or multiple attachment sites.

Base 14 may be fitted onto an anchoring layer by applying an outwardly directed force (as shown by arrows in FIG. 4) against any point(s) of arms 46, 48 such that arms 46, 48 expand to allow base 14 to be slipped over an anchoring layer. Once base 14 is positioned into place on the anchoring layer, arms 46, 58 clamp onto the anchoring layer to secure base 14 in place. To further secure base 14 to the anchoring layer, screws, nails, etc. may be attached to the anchoring layer via attachment site 62.

The length of each of arms 46, 48 is preferably equal, and the length may vary depending on the height of the anchoring layer. However, for an anchoring layer having a height of about 12 inches, arms 46, 48 each preferably comprises a height of about 1 inch to about 10 inches, with about 2 inches to about 6 inches preferred, and about 2 inches to about 4 inches more preferred; and horizontal member 190 preferably comprises a height of about 0.25 inch to about 4 inches, with a height of about 0.50 inch to about 2 inches preferred, and a height of about 0.50 inch to about 1 inch more preferred.

Similarly, space 198 between arm 46 and arm 48 will vary depending on the width of the anchoring layer. In a preferred embodiment, arms 46, 48 taper inwardly from top portion 50 to bottom portion 60 such that a space between the upper part of arms 46, 48 is greater than the a space between the lower part of arms 46, 48. Although the degree of tapering may vary, in an especially preferred embodiment, the lower parts of arms 46, 48, i.e., those parts furthest away from horizontal member 190, are about 0.25 inch closer to each other than the top parts of arms 46, 48, i.e., those parts closest to horizontal member 190. The tapering of arms 46, 48 creates a clamping effect when the base is positioned onto an anchoring layer such that when the base is positioned onto the anchoring layer, an inwardly directed force from the base is asserted onto the anchoring layer.

Base 14 also preferably comprises a width 64 of about 0.5 inch to about 6 inches, with about 1 inch to about 4 inches preferred, and about 1 inch to about 2 inches especially preferred.

Another exemplary retaining device is described with reference to FIGS. 6-10. Referring to these figures a retaining device 200 comprises a securing element 202 attached to a base 204.

Figure 5:
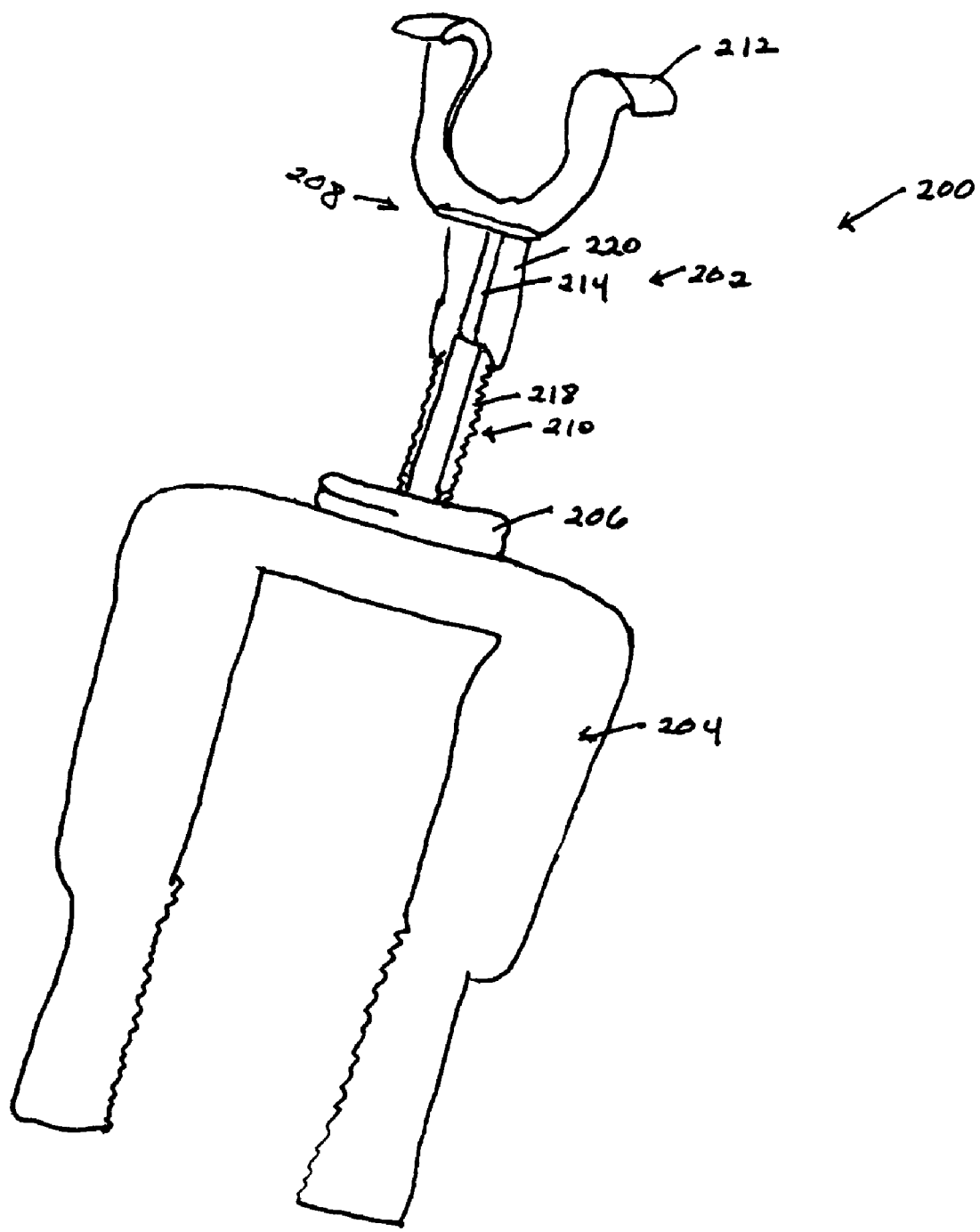
FIG. 5 is a schematic of another exemplary retaining device.
Figure 6:
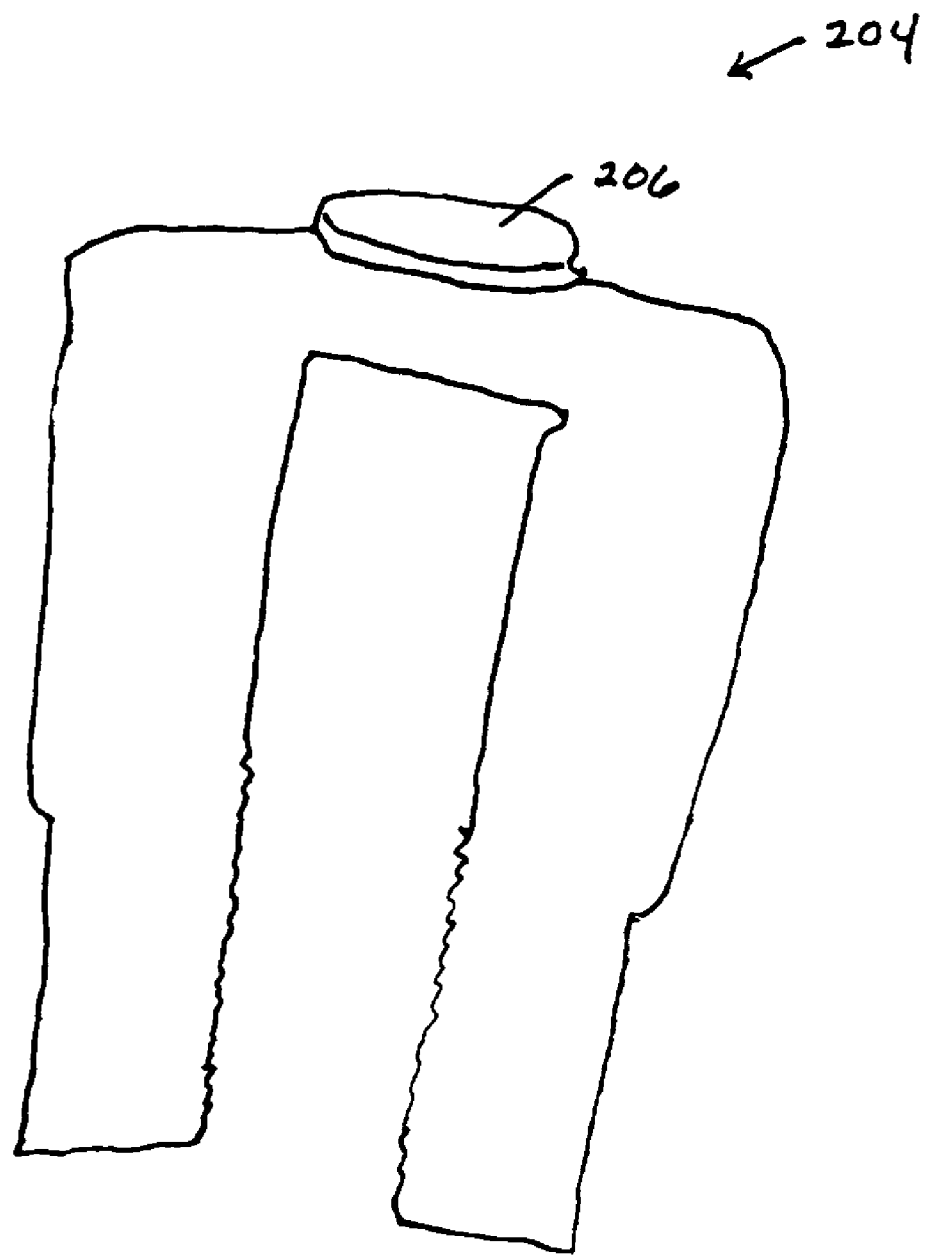
FIG. 6 is a schematic of an exemplary base of the retaining device depicted in FIG. 5.

Referring to FIGS. 5 and 6, base 204 comprises the same elements as described with reference to FIG. 4. Additionally, base 204 comprises a bonnet 206 positioned on a top surface of base 204.

Figure 7:
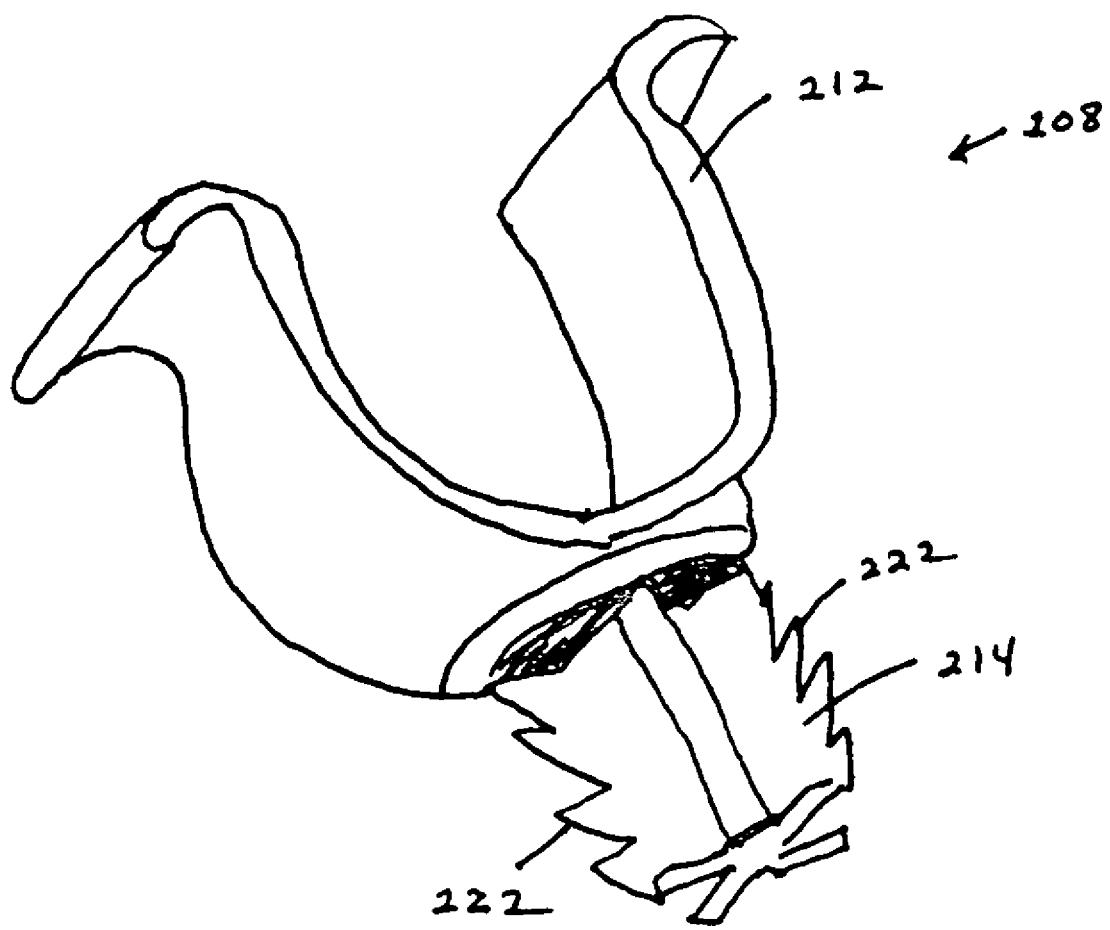
FIG. 7 is an exemplary upper piece of the retaining device depicted in FIG. 5.
Figure 8:
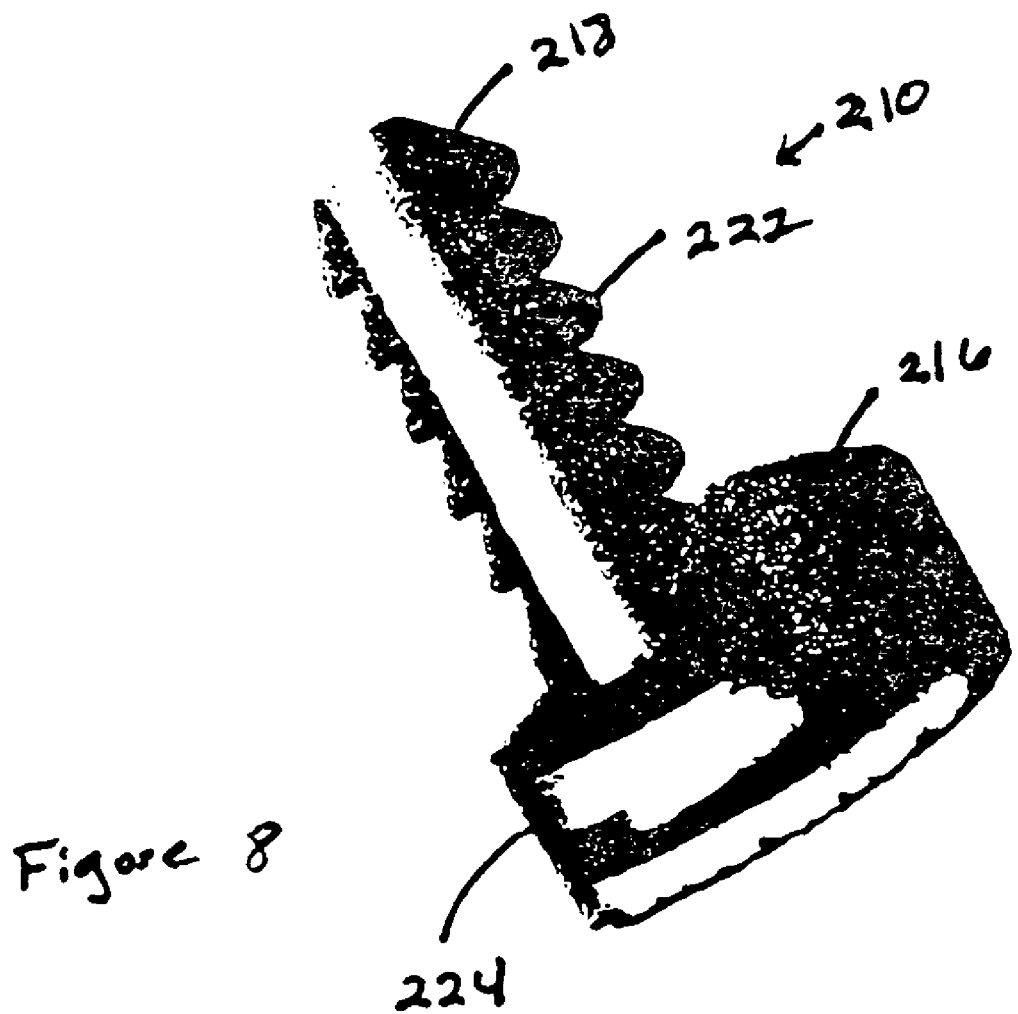
FIG. 8 is an exemplary portion of the lower piece of the retaining device depicted in FIG. 5.

Referring to FIGS. 5, 7, and 8, and securing element 202 comprises an upper piece 208 and two lower pieces 210. Upper piece comprises a receiver 212, used for holding a desired object, and a connector 214, wherein receiver 212 is secured to connector 214. Lower pieces 210 each comprise a mount piece 216 and a connector 218. Each of mount pieces 216 is configured to securely fasten to bonnet 206. Each of mount piece 216 comprises a hollowed region 224 that allows the mount pieces 216 to slide onto bonnet 204. Connectors 214 and 218 are configured to secure a connecting element 220.

Figure 9:
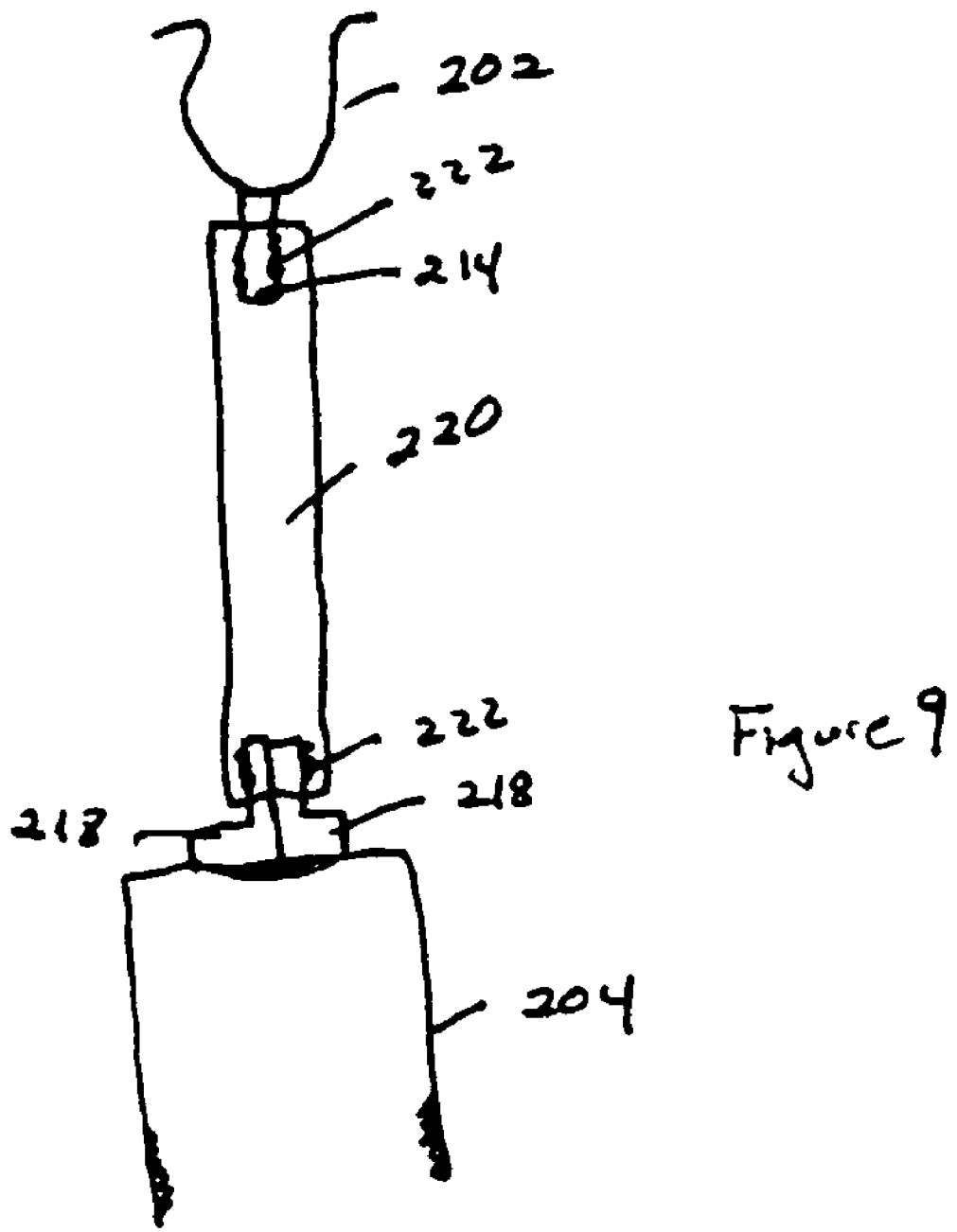
FIG. 9 is an exemplary application of the retaining device depicted in FIG. 5.

Referring to FIG. 9, in an exemplary application of retaining device 200, connectors 214 and 218 comprise jagged ribs 222 to hold a connecting element 220 comprising a standard polyvinyl chloride pipe. Connector element 220 is secured onto and between each of connectors 214 and connector 218. When positioned onto each of connectors 214, connector element 220 pushes the two connectors 214 towards each other, causing connectors 214 to slide on bonnet 206 until the connectors 214 meet. Connector element 220 may comprise a wide variety of lengths such that the total height of retaining device 200 may be adjusted as desired. Additionally, it is contemplated that a plurality of retaining devices 200 may be used, wherein each comprises a connector element of varying lengths such that the retaining devices 200 may hold an object at varying pitches.

Figure 10:
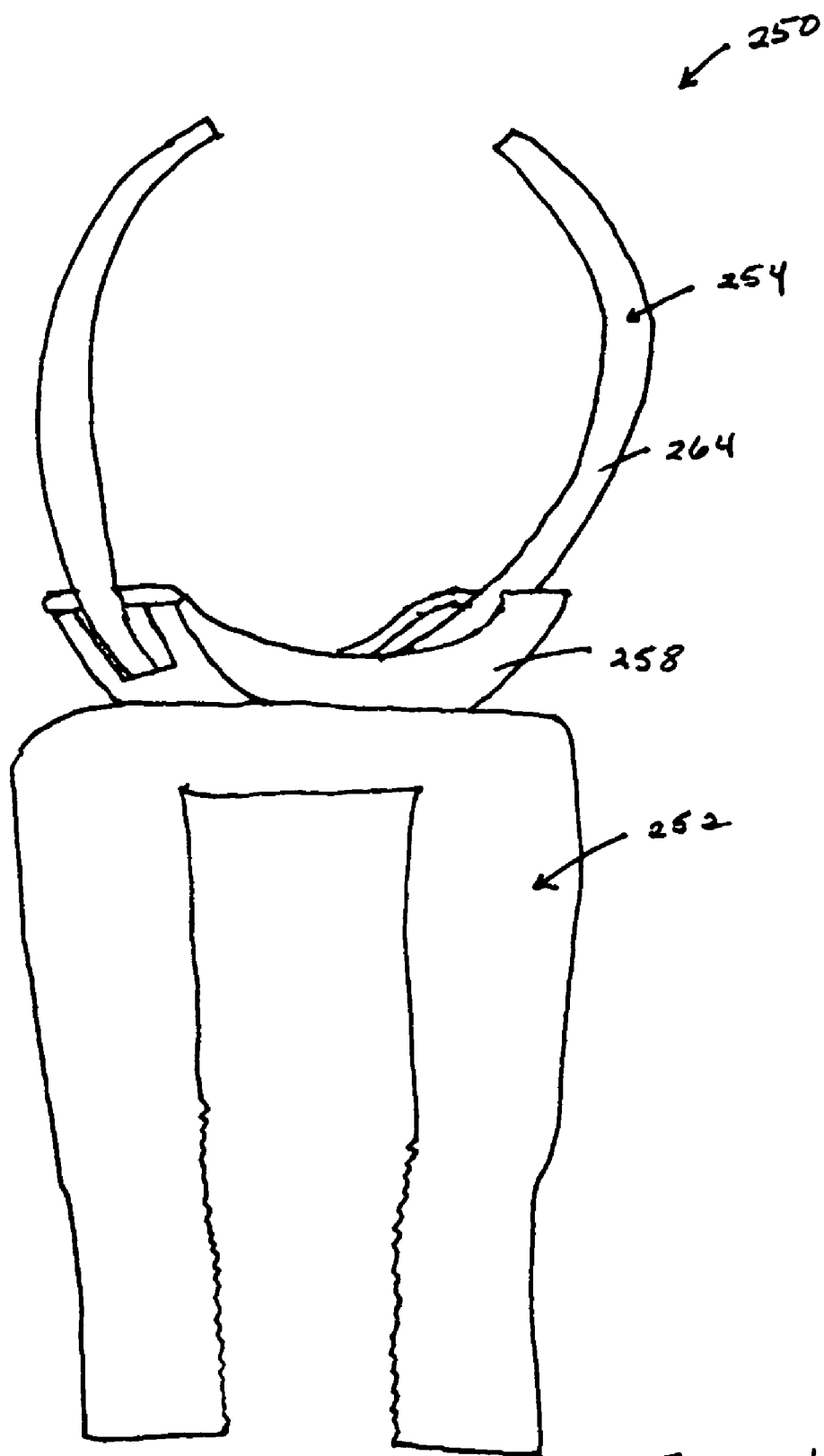
FIG. 10 is schematic of another exemplary retaining device.
Figure 11:
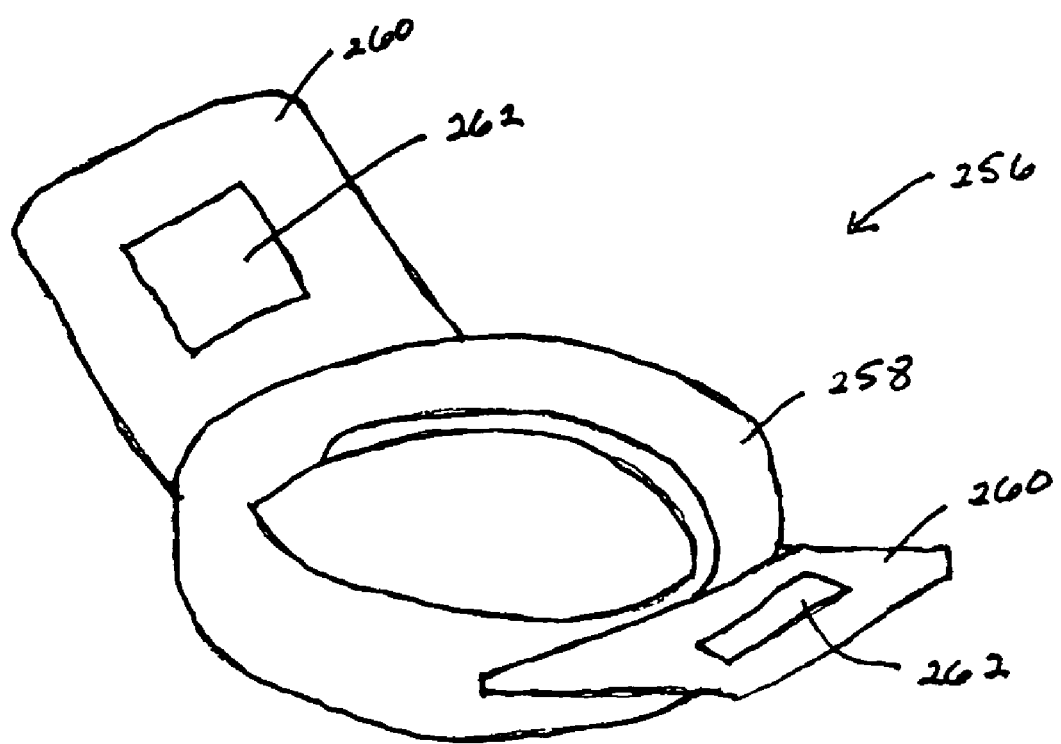
FIG. 11 is a schematic of an exemplary swivel clip of the retaining device depicted in FIG. 10.

Another exemplary retaining device is depicted in FIGS. 10 and 11. Referring to these figures, a retaining device 250 comprises a base 252 and a securing element 254. Base 252 is identical to the bases previously disclosed herein with the exception that the top portion of base 252 comprises a swivel clip 256. Swivel clip 256 comprises an annular ring 258 which is configured to snap onto base 252. Swivel clip 256 further comprises two wing elements 260 attached on opposite sides of annular ring 258. Each of wing elements 260 comprises an opening 262. Securing element 254 comprises a tying element 264, such as a wire tie, that may be looped through wing elements 260. Tying element 264 may be used to secure an object by wrapping tying element 264 around the object and then by tying the two ends of tying element 264.

Figure 12:
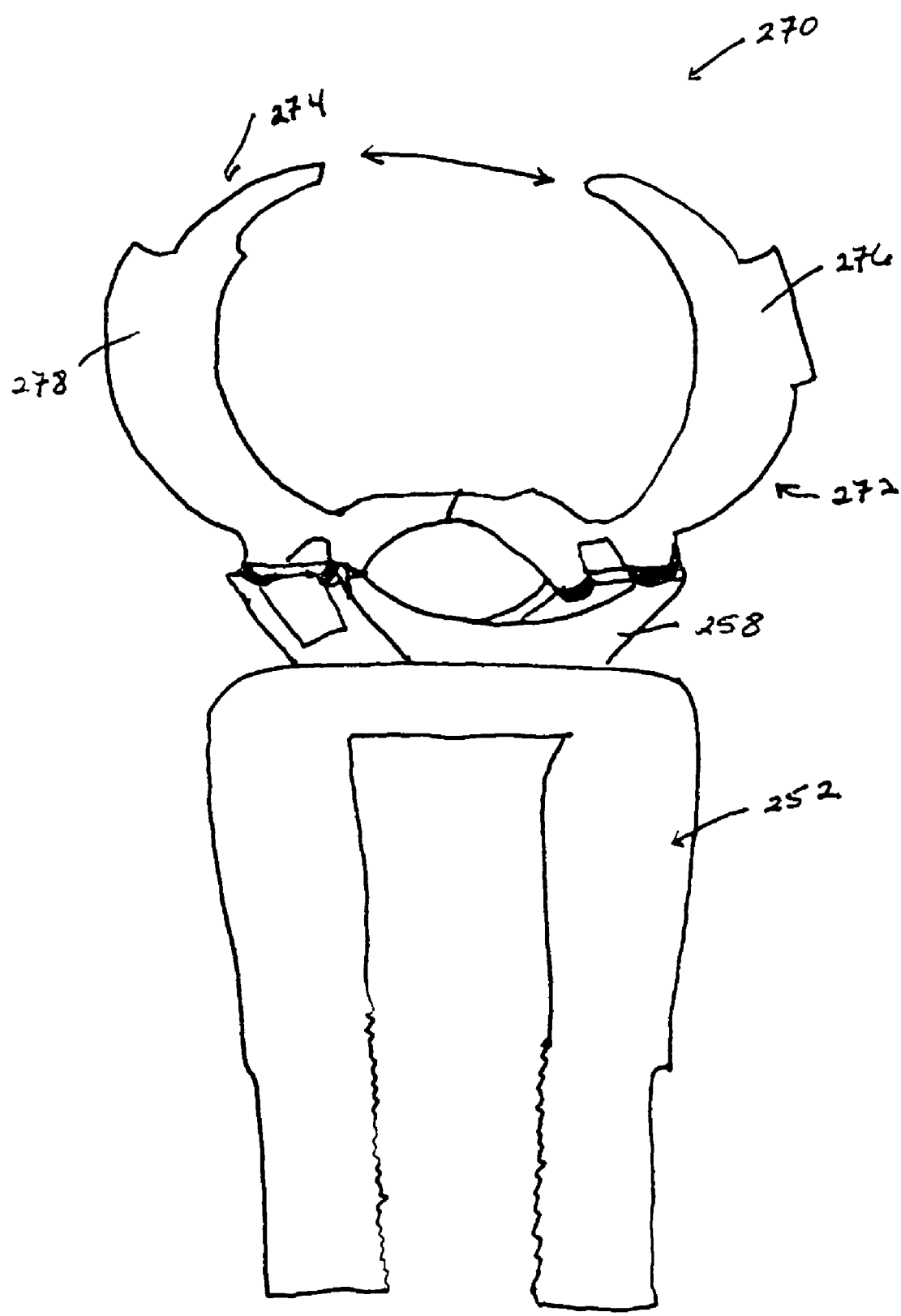
FIG. 12 is a schematic of another exemplary retaining device.

Another exemplary retaining device is depicted in FIG. 12, wherein the retaining device is a modification of retaining device 250. Referring to FIG. 12, a retaining device 270 comprises a base 252 identical to that described in reference to FIG. 12. Additionally, retaining device 270 comprises a securing element 272, wherein securing element 272 comprises an adjustable clamping mechanism 274 comprising two grippers 276, 278. Grippers 276, 278 are configured to attach to each other such that securing element 272 may close around the object to be held (see arrows). Such a configuration may comprise a set of interlocking and overlapping teeth. This embodiment may be used to hold a variety of objects having a wide variety of dimensions. For example, the same retaining device 250 may be used to hold pipes having various diameters, as the diameter of securing element 272 may be adjusted through grippers 276 and 278.

Figure 13:
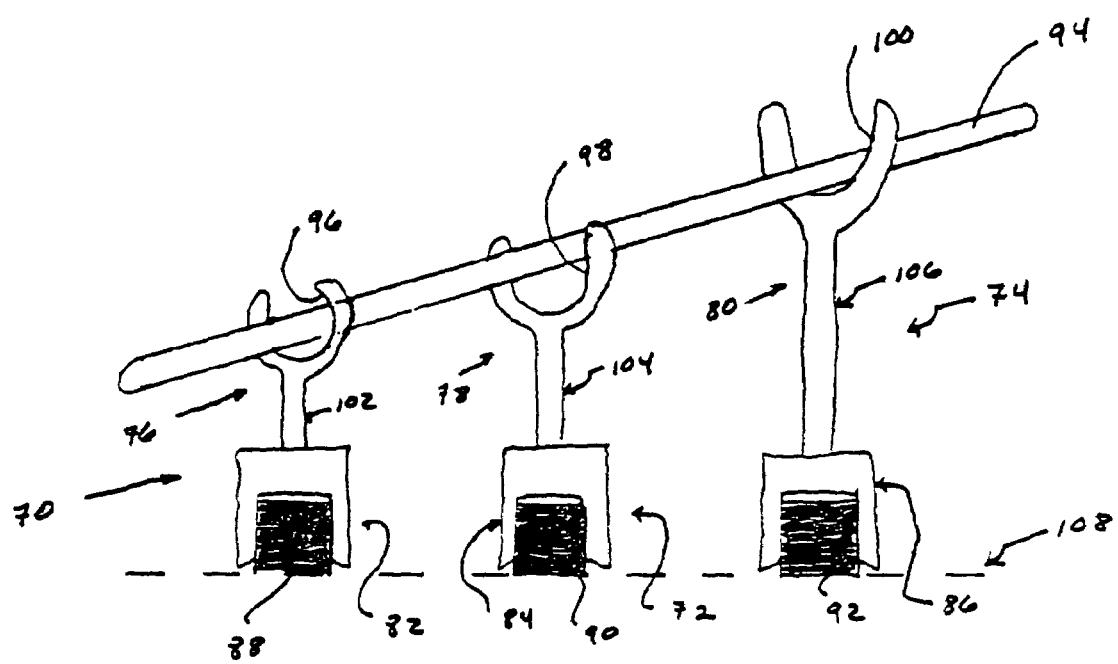
FIG. 13 is a schematic of an exemplary use of a series of exemplary retaining devices.

The retaining device as disclosed herein is particularly well suited for holding piping when it is desired to hold the piping at various pitches. For example, as shown in FIG. 13, retaining devices 70, 72, 74, each comprising a respective securing element 76, 78, 80 and a respective base 82, 84, 86 as discussed above in reference to FIGS. 1-3, are fitted over a respective framing stud of building structure 88, 90, 92. A pipe 94 is secured along interior walls 96, 98, 100 of respective securing elements 76, 78, 80. The length of each of vertical parts 102, 104, 106 vary from each other such that the distance of pipe 94 from a ground surface 108 can vary from any point along a length of pipe 94.

Such variance in the length of the vertical part can be accomplished by physically adjusting the length of the vertical part by means of a length adjustable mechanism, such as by a telescopic mechanism; or by using a plurality of vertical part each preformed to have a different length from the other vertical part forming the plurality. For example, in a preferred embodiment, retaining devices 70, 72, 74 are pre-molded to incrementally sized heights. For example, retaining device 70 may comprise a height of about 6 inches, retaining device 72 may comprise a height of about 6.5 inches, and retaining device 74 may comprise a height of about 7 inches. It is contemplated that a countless number of additional retaining devices may be fashioned in incrementally extending heights.

Figure 14:
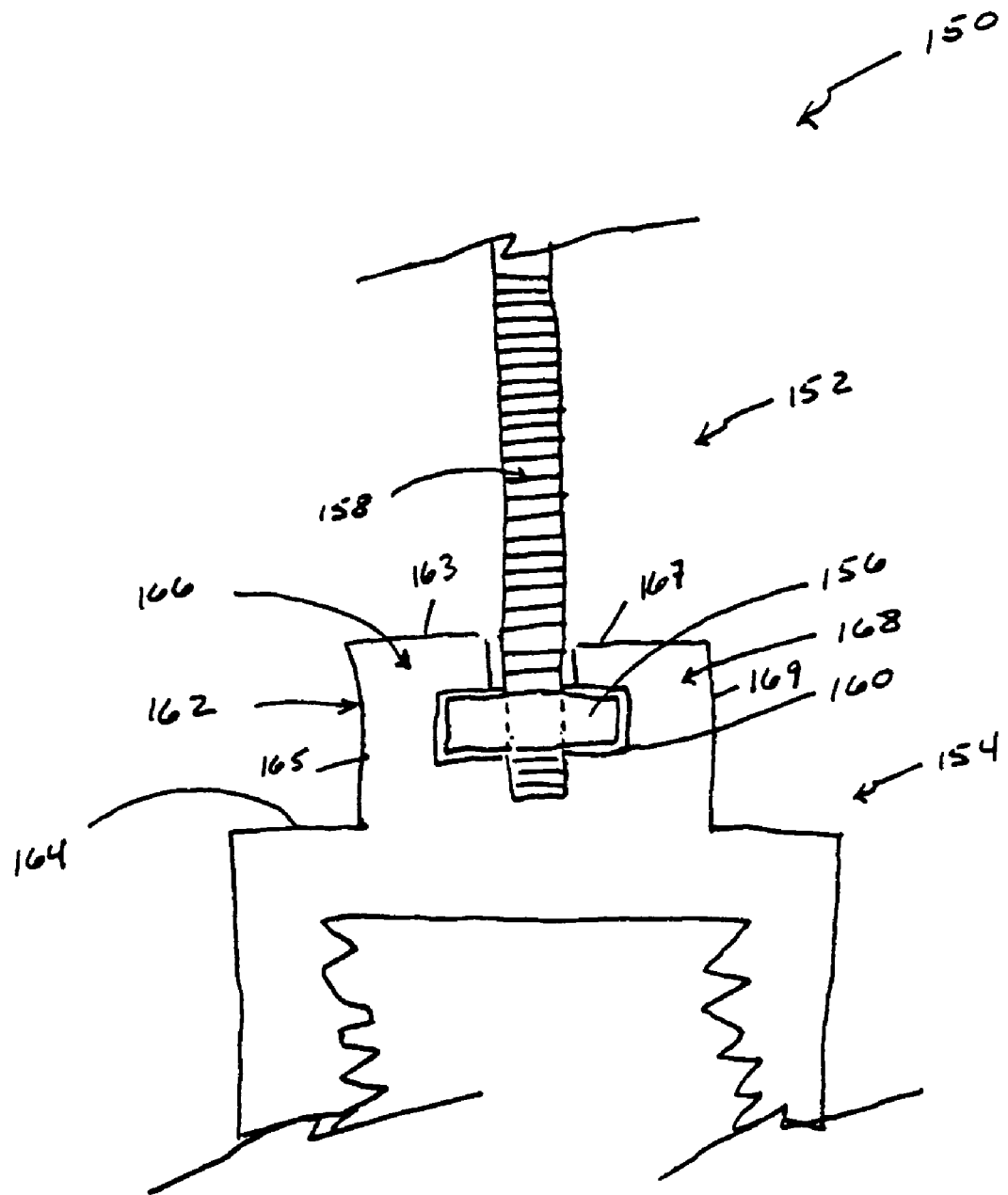
FIG. 14 is a schematic of another exemplary retaining device.

In an alternative exemplary embodiment, the retaining device disclosed herein may be used to hang objects. Referring to FIG. 14, a retaining device 150 comprises a securing element 152 attached to a base 154 and secured to base 154 by a fastening means 156. Securing element 152 comprises a vertical part comprising a rod, for example a threaded rod 158, wherein the object to be hanged (not shown) comprises elements that are configured to engage with threaded rod 158 to secure the object. Securing element 152 may comprise any rod commonly used for hanging equipment, wherein a rod having a diameter of about 0.375 inch to about 0.5 inch is preferred.

Base 154 comprises an uppermost member 162 that extends from a top side 164. Uppermost member 162 may be permanently molded into top side 164, or may be removably attached thereto. Uppermost member 162 comprises a first portion 166 comprising a horizontal extension 163 connected to a vertical extension 165, wherein vertical extension 165 is connected to top side 164 of the base 154. Uppermost member 162 further comprises a second portion 168 comprising a horizontal extension 167 connected to a vertical extension 169, wherein vertical extension 169 is connected to top side 164 of base 154. First and second vertical extensions 165, 169 are connected at base 154 to form a receiving slot 160. Receiving slot 160 is formed to fit fastening means 156. Fastening means 156 may comprise a nut, for example, wherein a 0.375 inch diameter to about a 0.5 inch diameter nut is preferred. In this embodiment, base 154 may be attached to a ceiling stud (not shown), for example, wherein such attachment is preferably further secured by use of an attachment site (such as shown in FIG. 4, wherein the attachment site is a hole represented by reference numeral 62), such that securing element 152 is positioned downwards to allow for the hanging of various types of equipment or other objects. Retaining device 150 may hold objects comprising weights of at least up to about 150 pounds.

Figure 15:
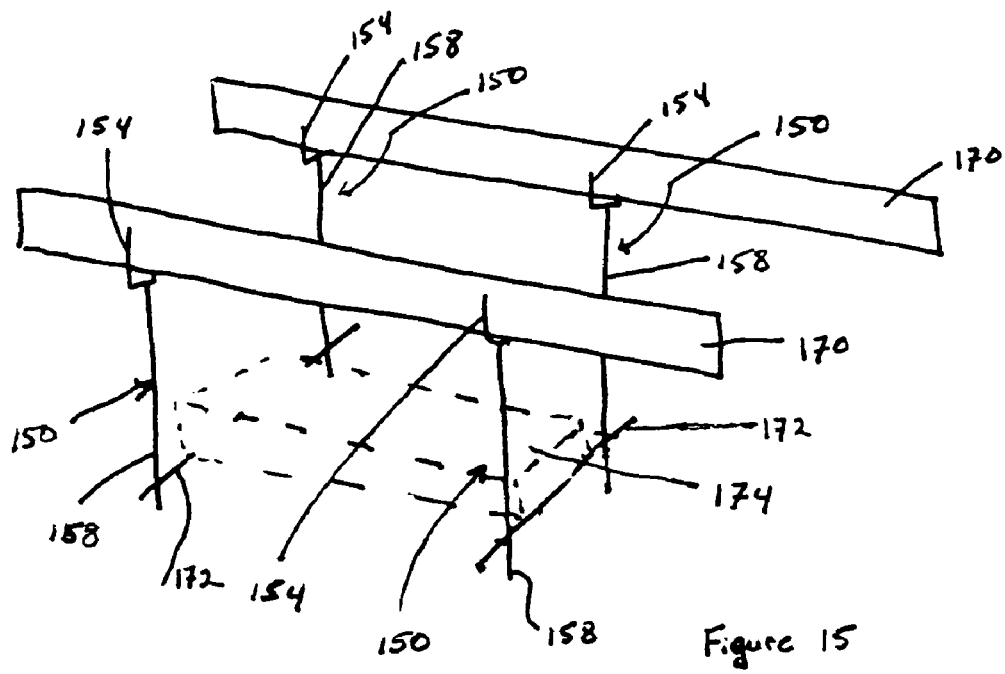
FIG. 15 is a schematic of an exemplary use of a plurality of retaining devices, wherein the plurality comprises the retaining devices depicted in FIG. 14.
Figure 16:
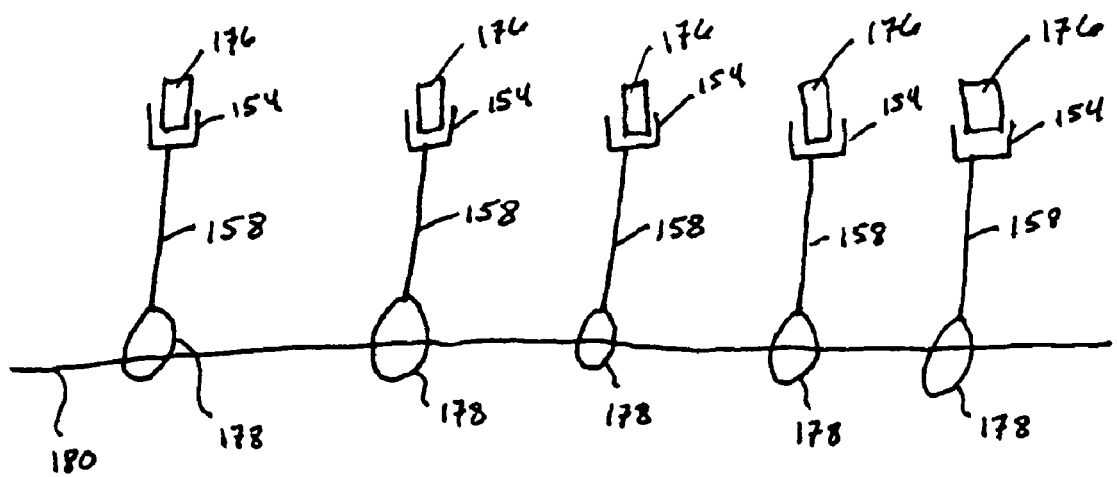
FIG. 16 is a schematic of another exemplary use of a plurality of retaining devices, wherein the plurality comprises the retaining devices depicted in FIG. 14.

FIGS. 15 and 16 depict exemplary uses of the retaining device described above with reference to FIG. 14. Referring to FIG. 15, a plurality of retaining devices 150 are suspended from studs 170 by means of bases 154. Supports 172, such as an angle iron or strut conventionally known in the art, are threaded onto threaded rods 158 such that each of supports 172 lie parallel to each other and transversely from studs 170. An object 174, such as an air conditioning unit, is positioned between studs 170 and rested on supports 172.

Referring to FIG. 16, a plurality of retaining devices 150 are suspended from studs 176 by means of bases 154. Hangers 178 attached to each of threaded rods 158 provide the means for holding an object 180, such as a pipe.

Another exemplary retaining device is depicted in FIG. 17. Referring to FIG. 17, a retaining device 110 comprises a base 112 and a securing element 114. Base 112 may encompass all of the structural characteristics described in reference to FIGS. 1 and 4. Securing element 114 comprises a lower lip 116 connected to an upper lip 118 to create a space 120. Lower lip 116 and upper lip 118 both comprise a proximal lateral protrusion 122, 124 respectively and a distal lateral protrusion 126, 128 respectively. Proximal lateral protrusion 124 and distal lateral protrusion 128 are preferably formed to fit into a groove 130 on an exterior surface 132 of corresponding proximal lateral protrusion 122 and distal lateral protrusion 126 of lower lip 116. Similarly, proximal lateral protrusion 124 and distal lateral protrusion 126 are preferably formed to fit into a groove 134 on an interior surface 136 of corresponding proximal lateral protrusion 124 and distal lateral protrusion 128 such that lower lip 116 and upper lip 118 are fixedly interconnected. Upper lip 118 may be completely removable from lower lip 116, or either one of proximal or distal lateral protrusions 124, 128 may be attached to lower lip 116 by a fastening means, such as, for example, a screw or by means of hinging on one side so that upper lip 118 may open and close upon lower lip 116 in a hinged fashion.

Securing element 114 is designed to hold piping, wherein the piping is preferably disposed onto an interior surface 140 of lower lip 116. When securing element 114 is in a closed position, i.e., when proximal and distal lateral protrusions 122, 126 of lower lip 116 are in physical communication with proximal and distal lateral protrusions 124, 128 of upper lip 118, the piping may also be physically disposed onto interior surface 136 of upper lip 118.

An exterior surface 132 of lower lip 116 is disposed onto a top side 144 of base 112. Exterior surface 132 may be permanently or detachably connected to base 112 by permanent or detachable means, wherein permanent means may include fusing securing element 114 to base 112, and detachable means may include, for example, screwing or snap fitting securing element 114 into base 112.

Although retaining device 110 of FIG. 17 has a number of applications, an exemplary use is for the containment and holding of the various refrigeration piping line sets for air conditioning systems for different size pipes. Additionally, the retaining devices depicted in the figures, may be used for many low voltage wiring applications, i.e., computer cabling, phone wiring, portable water piping, drainage piping, electric conduit piping, gas piping, for any cylindrical devices needed to be mounted and routed between any two points. The retaining devices disclosed herein are ideally suited for such use as they do not require the use of screws or other hardware to secure and contain the piping. Rather, the piping may be inserted through the hollowed portions of the securing elements manually, or the hanging objects may be suspended, without the use of any hardware. Additionally, the retaining device is prefabricated as a single unit such that the pieces need not be assembled into a single working unit at the time of installing the piece of equipment. Due to these improvements, the installation of equipment and piping is made more efficient and less burdensome.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A system for holding a piping at a varied pitch comprising:
a plurality of retaining devices, wherein each retaining device forming the plurality comprises:
a securing element comprising:
a vertical part comprising a top opposite to a bottom wherein a length of each of the vertical parts of the retaining devices is different from the lengths of the vertical parts of the other retaining devices forming the plurality; and
a receiver comprising a U-shaped structure defined by two side walls and a bottom wall, wherein the two side walls are opposite to each other, and wherein the bottom wall bridges and connects the two side walls to form a space between the two side walls, wherein the bottom wall is disposed on the top of the vertical parts, and wherein the side walls form an uppermost boundary of the securing element; and
a base comprising:
a horizontal member comprising a proximal side opposite to a distal side, and a top side opposite to a bottom side, wherein the top and bottom sides are adjacent to the proximal and distal sides, and wherein the top side of the horizontal member is connected to the bottom of the vertical parts;
a first arm connected to the proximal side and extending downwardly from the bottom side; and
a second arm connected to the distal side and extending downwardly from the bottom side, wherein the first arm and the second arm are connected to the horizontal member to form a space between the first and second arms, and wherein each of the first and second arms comprises a plurality of teeth, wherein the plurality of teeth on the first arm faces the plurality of teeth on the second arm;
a plurality of building structure framing studs, wherein the bases of each of the retaining devices are disposed over at least one of the framing studs of building structure forming the plurality such that the plurality of teeth on the first arm and the plurality of teeth on the second arm of the respective retaining devices bear into the respective framing stud; and
a piping disposed through the spaces of the receivers of the plurality of retaining devices.

2. A system for holding a piping comprising:
a plurality of retaining devices, wherein each retaining device forming the plurality comprises:
a securing element comprising:
a vertical part comprising a top opposite to a bottom; and a receiver comprising a U-shaped structure defined by two side walls and a bottom wall, wherein the two side walls are opposite to each other, and wherein the bottom wall bridges and connects the two side walls to form a space between the two side walls, wherein the bottom wall is disposed on the top of the vertical part, and wherein the side walls form an uppermost boundary of the securing element; and a base comprising:

a horizontal member comprising a proximal side opposite to a distal side, and a top side opposite to a bottom side, wherein the top and bottom sides are adjacent to the proximal and distal sides, and wherein the top side of the horizontal member is connected to the bottom of the vertical part;

a first arm connected to the proximal side and extending downwardly from the bottom side; and a second arm connected to the distal side and extending downwardly from the bottom side, wherein the first arm and the second arm are connected to the horizontal member to form a space between the first and second arms, and wherein each of the first and second arms comprises a plurality of teeth, wherein the plurality of teeth on the first arm faces the plurality of teeth on the second arm;

a plurality of building structure framing studs, wherein the bases of each of the retaining devices are disposed over at least one of the framing studs of building structure forming the plurality such that the plurality of teeth on the first arm and the plurality of teeth on the second arm of the respective retaining devices bear into the respective framing stud; and a piping disposed through the spaces of the receivers of the plurality of retaining devices.

* * * * *